United States Patent [19]

Gutierrez

[11] 4,026,274
[45] May 31, 1977

[54] TEA KETTLE STRUCTURE

[76] Inventor: Julian Gutierrez, 6233 Brookview Ave. South, Minneapolis, Minn. 55424

[22] Filed: Dec. 12, 1974

[21] Appl. No.: 532,207

[52] U.S. Cl. ................................. 126/390; 220/13
[51] Int. Cl.² ........................................ A47J 27/21
[58] Field of Search ........................ 220/13, 17, 23; 126/373, 390, 376, 377

[56] References Cited

UNITED STATES PATENTS

| 53,139 | 3/1866 | Gove | 220/17 |
| 850,028 | 4/1907 | Major | 126/377 |
| 1,407,088 | 2/1922 | Samuels | 126/373 |
| 2,100,172 | 11/1937 | Riegel | 220/23 |
| 2,981,435 | 4/1961 | McCarthy | 220/17 |
| 3,304,852 | 2/1967 | Lande | 220/17 |

*Primary Examiner*—John J. Camby
*Assistant Examiner*—Larry I. Schwartz

[57] ABSTRACT

A tea kettle structure wherein the improvement consists of said tea kettle having an outer body portion having an inner body portion comprising an annular side wall and a bottom in spaced relation to the side wall and bottom of said outer body portion forming a chamber therebetween and a member directing the passage of water from the spout of said outer body portion into said chamber for relatively quicker heating than otherwise of said water therein, said inner body portion having a chamber therein to receive the overflow of water from said first mentioned chamber for use of the full capacity of said tea kettle as may be desired.

3 Claims, 10 Drawing Figures

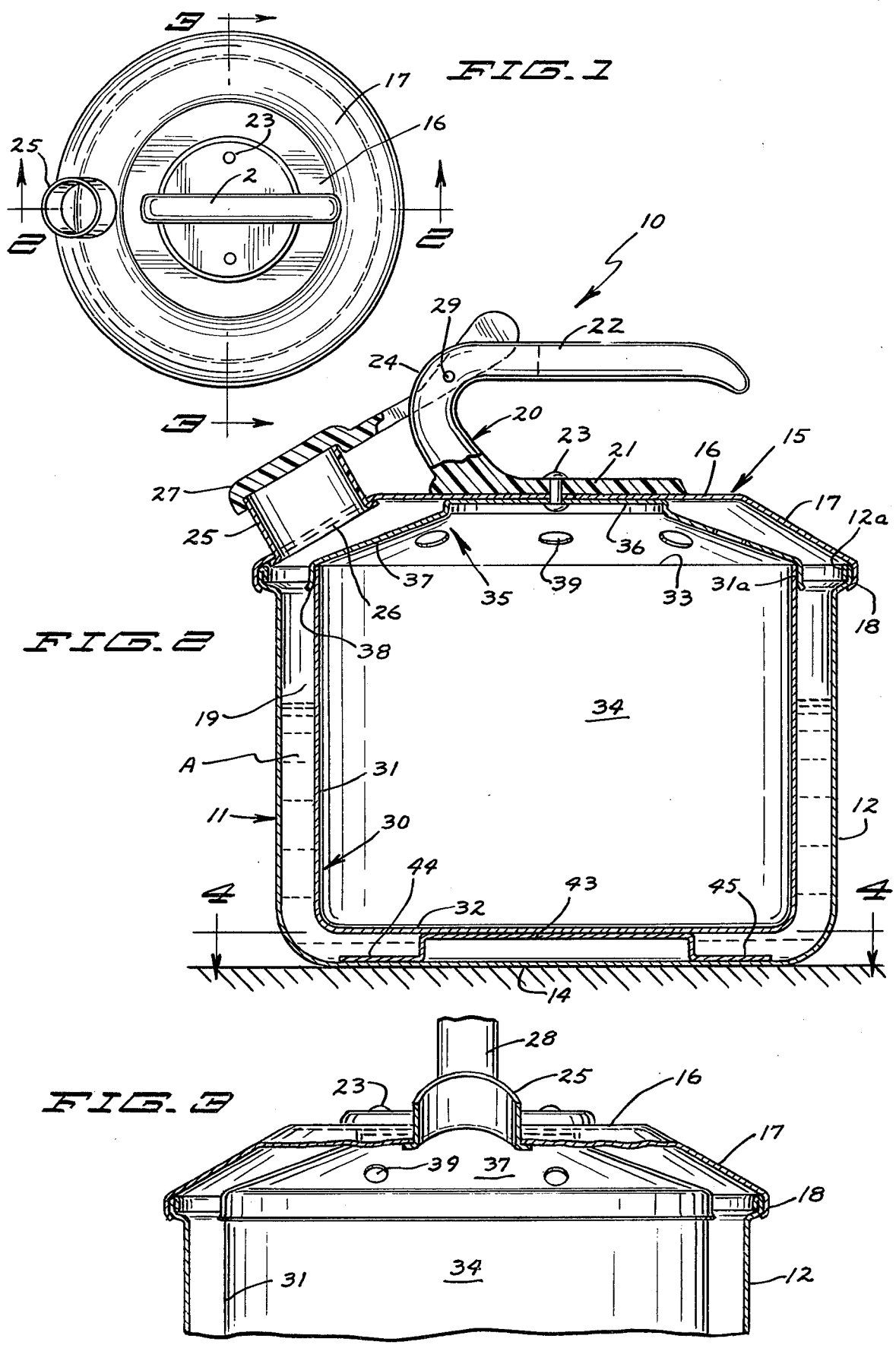

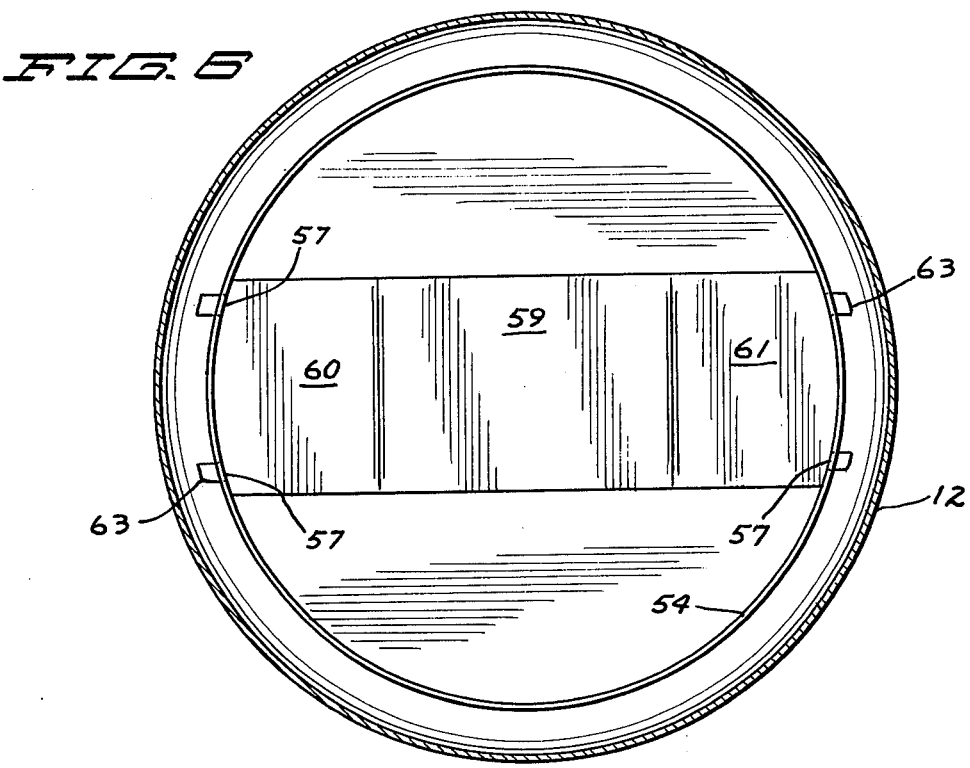
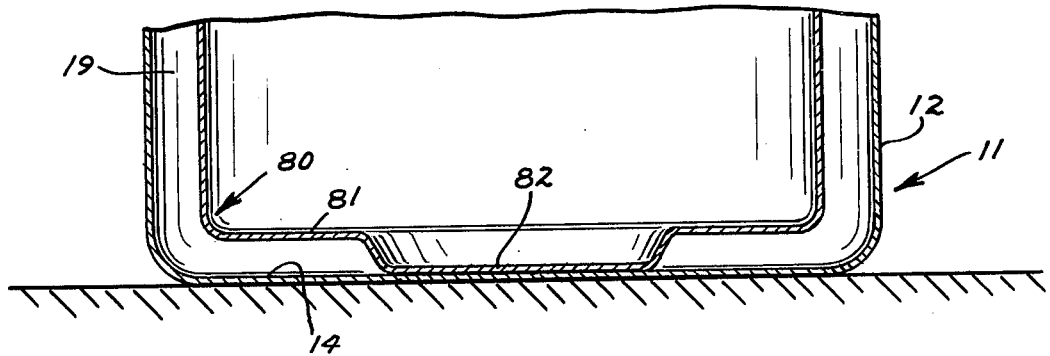
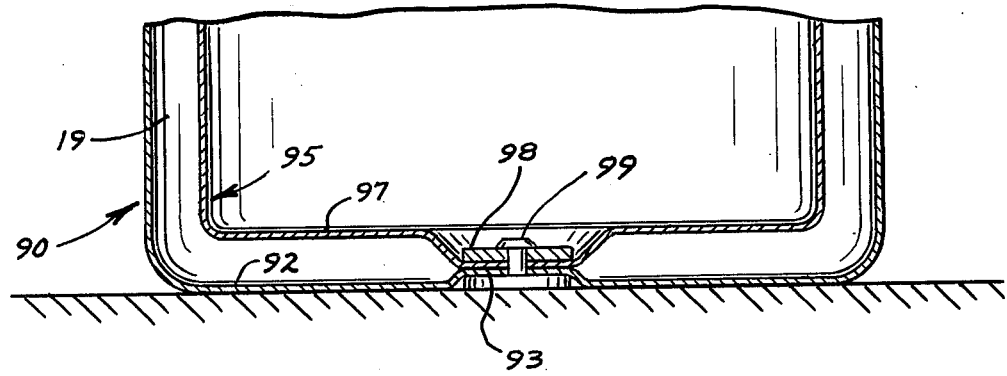

TEA KETTLE STRUCTURE

BACKGROUND AND SUMMARY OF THE INVENTION

It is the purpose of this invention to make a substantial improvement in the structure of a tea kettle of the type in common use to lessen the period of time otherwise required to heat a body of water therein.

It is a further purpose of this invention to significantly reduce the quantity of energy otherwise required and used to heat a body of water in a tea kettle and to retain the heated water therein at a higher temperature for a longer period of time than is otherwise the case.

The tea kettle most commonly in use has been found to have a two and one half quart capacity. This is a substantially larger capacity than is usually required for average use such as heating water for making tea or for making an instant type of coffee. The average family may require five or six cups of such a beverage or combination of beverages at any given time. A two and one half quart capacity tea kettle represents on the order of 14 to 16 cups of the capacity usually used for serving tea or coffee.

Recognizing that a tea kettle for average use will be only partially filled, the invention herein modifies the structure of a tea kettle to provide a chamber of a size to hold the average amount of water heated at a given time and to provide an improved efficiency in heating said water and which will also permit use of substantially the full capacity of said tea kettle if such capacity is desired.

The invention herein provides for the modification of a tea kettle structure to include an inner body portion in spaced relation to the bottom and side wall of said tea kettle to form a chamber therebetween with said chamber having the capacity to hold the average amount of water heated at a given time. Said inner body portion also forms a receptacle or chamber therein which may be filled with water if additional capacity is required which makes possible the use of substantially the full capacity of said kettle.

Tests have indicated the merit of the invention in lessening the time required for heating a given body of water.

In one test conducted, five cups of water were heated in a two and one half quart capacity conventional tea kettle on a gas burner and a like amount of water was heated in a like kettle modified in accordance with the invention herein. The time to bring the water to a boiling point was 2 minutes and 10 seconds longer in the conventional tea kettle than in the modified tea kettle. Testing has also indicated a higher temperature for a longer period of time of heated water in the kettle of the invention herein than otherwise.

It is an object of this invention, therefore, to provide a tea kettle structure adapted to heat water in lesser time and retain temperature at a higher degree for a longer period of time than is the case with a conventional tea kettle.

It is another object of this invention to provide a tea kettle with a chamber therein to contain a limited amount of water and to permit the use of the full capacity of said tea kettle as may be desired.

It is another object of this invention to provide an inner body portion in a tea kettle spaced from the side wall and bottom of said tea kettle forming a chamber therebetween and said inner body portion having a chamber therein and means for communication therebetween.

With reference to the preceding object, it is also a more specific object of the invention herein to provide means for conducting heat directly from a heat source to said inner body portion.

These and other objects and advantages of the invention will be set forth in the following description made in connection with the accompanying drawings in which like reference characters refer to similar parts throughout the several views and in which:

FIG. 1 is a top plan view showing a portion thereof in dotted line;

FIG. 2 is an enlarged view in vertical cross section taken on line 2—2 of FIG. 1 as indicated;

FIG. 3 is an enlarged broken view in vertical section taken on line 3—3 of FIG. 1 as indicated;

FIG. 6 is a view in horizontal section taken on line 6—6 of FIG. 5 as indicated;

FIGS. 7 and 8 are broken views in vertical section showing further modification of details of structure;

DESCRIPTION OF A PREFERRED EMBODIMENT

Figure 4:
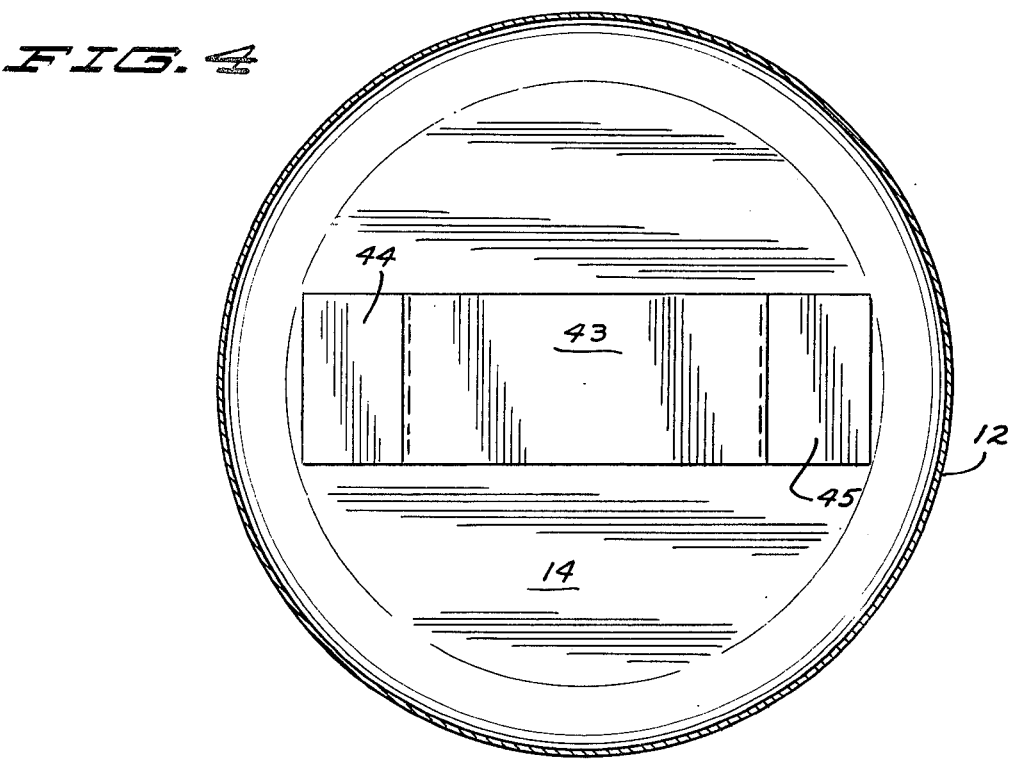
FIG. 4 is a view in horizontal section taken on line 4—4 of FIG. 2 as indicated.

Referring to the drawings and more particularly to FIGS. 1–4, an exemplary embodiment is shown of a kettle structure 10 comprising the subject matter of the invention herein.

Said kettle structure comprises an outer housing member 11 substantially cylindrical in form having an annular side wall 12, a bottom wall 14 and an upper body portion 15. Said upper body portion includes a top wall 16 having an inclined annular side wall portion 17 thereabout having a small radius terminating in a depending annular peripheral portion 18 indicated as being crimped into position about the upper edge outwardly off-set portion 12a of the side wall 12.

Secured to said top portion 16 and positioned centrally thereover is a conventional type of handle member 20 having a hand holding portion 22 and having a substantially circular base portion 21 which is apertured to have, as here shown, a pair of spaced rivets 23 extend therethrough and through said top portion 16 as will be further described.

Projecting outwardly of said wall portion 17 is a cylindrical spout 25 providing communication with the interior of said housing 11 through its underlying opening 26 and having a cover portion 27 overlying the upper open end thereof, said cover portion has an extension thereof connected to said handle 20 being pivoted to an intermediate bifurcated portion 24 thereof as by a pin 29 as illustrated and which structure is conventional.

Disposed within said outer housing is a substantially cylindrical inner housing member 30 having an annular side wall 31, a bottom wall 32 and having an upper open end 33 and thus forming a chamber 34 therein.

Said housing 30 has a top wall 35 which is here shown having a flat central portion 36 and somewhat downwardly offset therefrom and angled or sloped downwardly thereabout is an annular wall portion 37 having a depending peripheral or edge portion 38 overlying the upper edge portion 31a of said side wall 31 and it may readily be secured as by a press fit or by bonding. Said top wall has a plurality of apertures 39 spaced thereabout.

Said top wall will be apertured to receive said rivets 23 whereby said top walls 16 and 36 with said handle portion 21 thereover are secured together. It will be noted that there are no apertures 39 in said wall 35 underlying the spout 25 whereby liquid entering said spout 25 will pass directly into the chamber 19 of said outer housing 11, said chamber surrounding said inner housing member 30.

Underlying said inner housing 30 is an upset strap or plate member 43 engaging the bottom wall 32 of said housing 30 and having downwardly and outwardly angled end portions 44 and 45 engaging the inner surface of the bottom wall 14 held in position by pressure fit and providing for direct heat transmission from said outer bottom wall 14 to said inner housing bottom wall 32.

OPERATION

The kettle 10 above described is formed to have the chamber 19 therein have a capacity for the average amount of water heated as for home use for making a beverage such as tea or an instant coffee, said capacity being on the order of four or five cups.

The annular wall portion 37 which underlies the spout 25 directs water A from said spout into said chamber 19. In the event more water is desired to be heated, water as it continues to flow into said chamber 19 will pass into the chamber 34 through the apertures 39. Thus, if desired, substantially the full capacity of said kettle 10 may be utilized.

The water within said chamber 19 will be heated through the bottom 14 and side wall 12 of the outer housing 11 of said kettle 10. Direct transmission of heat from the bottom wall 14 to the bottom wall 32 and thence to the side wall 31 also serves to heat said water A within said chamber 19. As said water becomes heated, said inner wall 31 and bottom 32 have not only served to accelerate the heating of said water but in turn become a barrier against the loss or dissipation of heat from said water assuring a quicker heating of said water than otherwise and a longer retention of heat therein than otherwise after the heat source is turned off.

MODIFICATION

Figure 5:
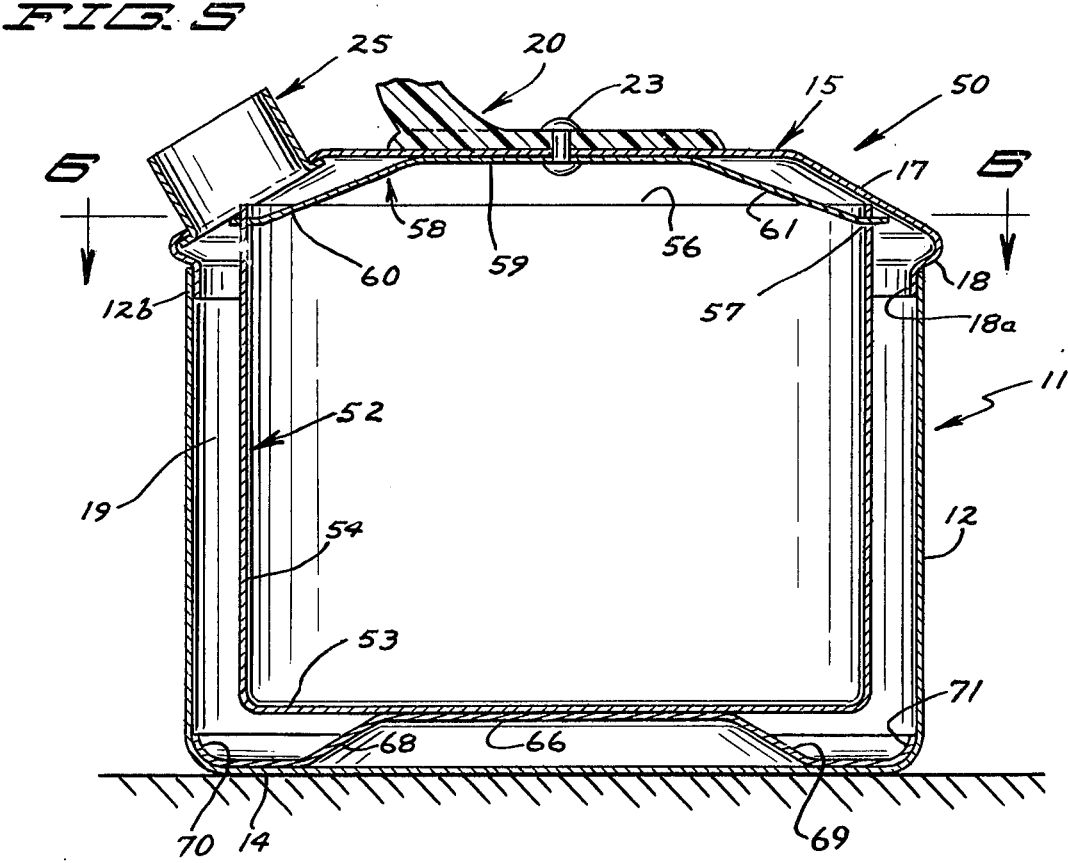
FIG. 5 is a view in vertical section of a modification with a portion broken away.

Referring to FIGS. 5 and 6, a modification 50 of the structure above described is shown in which all portions identical to those above described are indicated by like reference numerals.

The outer housing 11 is substantially the same as that above described with the exception of the connection between the upper wall 15 and the side wall 12.

It will be noted that here the depending peripheral portion 18 has an inwardly curved depending portion 18a which fits within the upper straight edge portion 12b of the annular side wall 12. The engaging edge portions may be readily bonded as by welding or by the use of a suitable adhesive.

An inner housing 52 having a bottom wall 53, an annular side wall 54 and an open top 56 is disposed within said housing 11.

Formed in the upper edge portion of said side wall are opposed pairs of spaced slots or apertures 57 formed to be at either side of said spout 25 and oppositely thereof.

A plate or strap member 58 having a central portion 59 and downwardly inclined end portions 60 and 61 is disposed across the open top of said housing 52 and is positioned by having projecting tongues or tabs 63 extend through said apertures. Said strap member will have some flexibility whereby in having said rivets 23 pass through a central portion thereof through accommodating apertures, it will be somewhat sprung upwardly to hold the upper edge portion of said annular side wall 54 under tension against the upper wall of said outer housing 11 as illustrated.

Underlying said housing is a spring-like strap member 66 having downwardly and outwardly extending end portions 68 and 69 having terminal portions 70 and 71 with curved ends to rest upon the inner surface of the bottom wall 14 of the outer housing 11 and extend to the opposed points of juncture of said bottom wall and the side wall 12.

MODIFICATION

Referring to FIG. 7, a modification is shown of a detail of the structure of the two embodiments above described having to do with the inner housing in which the inner housing here indicated by the reference numeral 80 may be in either form as above described but having its bottom wall 81 formed with a projecting central portion 82 to have a positive engaging contact with the inner surface of the bottom wall 14.

MODIFICATION

Referring to FIG. 8, another modification is shown of a detail of bottom wall structure of the inner and outer housing of the first two embodiments above described in which the remainder of the housing may be in either form as described.

The outer housing here indicated by the reference numeral 90 has a bottom wall 92 having an upstruck central portion 93 of small transverse dimension.

The inner housing 95 has a bottom wall 97 having a central outwardly struck or projecting central portion 98 in alignment with and corresponding to said upstruck portion 93, said portions being in superposed engaging relation and being secured by a rivet 99 appropriately disposed therethrough securing the same together as shown.

MODIFICATION

Figure 9:
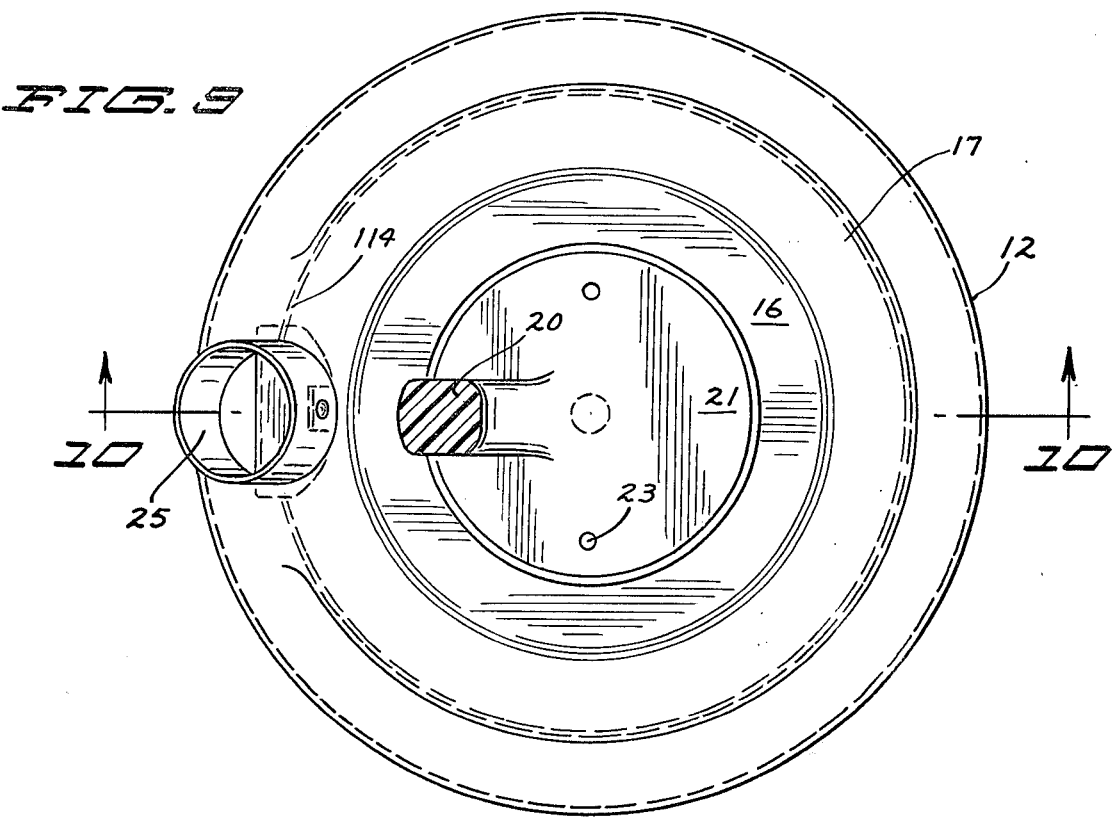
FIG. 9 is a top plan view of another modification with a portion in section.
Figure 10:
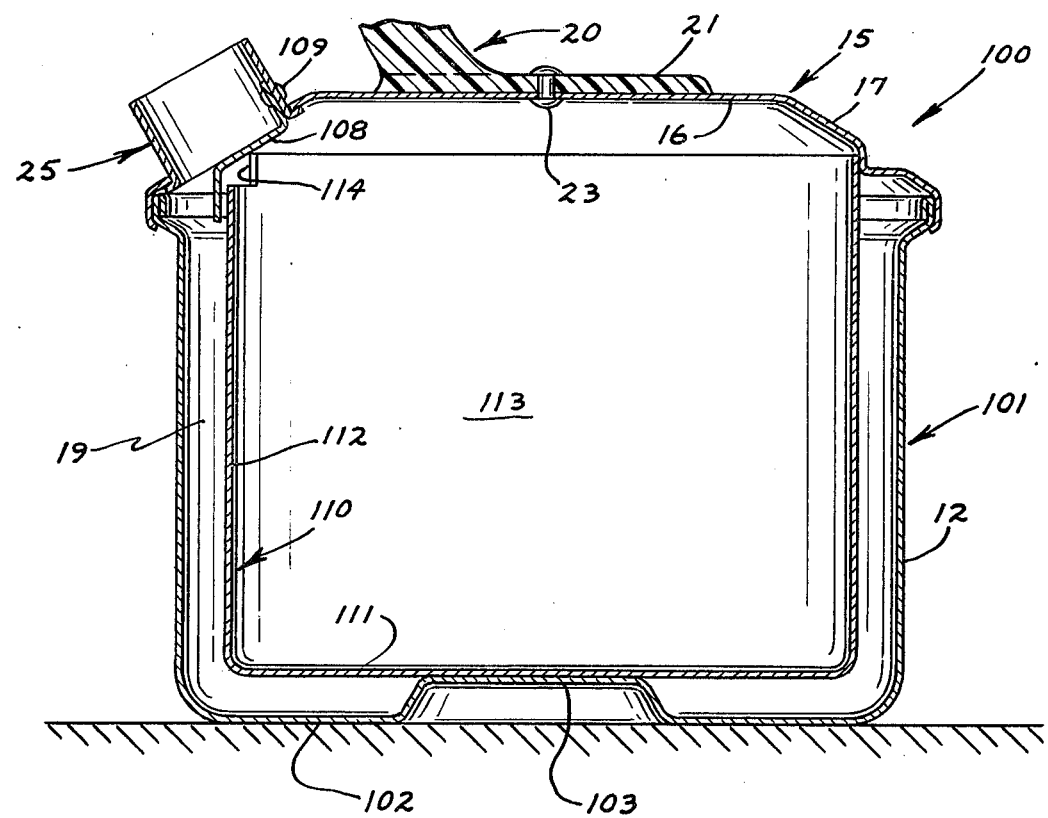
FIG. 10 is a view in vertical section taken on line 10—10 of FIG. 9 as indicated with a portion broken away.

Reference is now had to the modification of FIGS. 9 and 10 in which a tea kettle 100 is shown and which is substantially the same in structure as that of FIGS. 1–4 and in which like parts will be indicated by like reference numerals without further description being given.

The bottom wall 102 of said housing has a central upstruck portion 103 which serves as a support for and a means of direct transmission of heat to the bottom wall of an inner housing to be described.

Projecting from the top wall portion 17 is the spout 25 as first above described with the exception that a deflecting or diverting plate 108 is attached to the inner wall portion thereof adjacent the top of said tea kettle as by a weld or as shown by a rivet 109 and said plate member is angled to underlie said spout as illustrated to pass liquid into chamber 19 of said tea kettle as will be further described.

The inner housing 110 has a flat bottom wall 111 resting upon said upstruck portion 103, an annular wall 112 and a chamber 113 therein. Said wall has an elongated open top slot 114 in the upper edge portion thereof underlying said spout 25 and extending for a short distance to each side thereof. The purpose of said slot is to serve as a pouring spout to empty liquid from the chamber 113 out of said spout 25 from each side of said plate member 108.

The height of said wall 112 will be such that the upper edge thereof will bear against the upper wall portion 17 with sufficient pressure to be securely held in position.

The modifications of FIGS. 5–6, 7, 8 and 9–10 vary only in detail from the embodiment first above described.

The direct transmission of heat from the outer bottom wall to the inner bottom and side walls provides a second source of heat to heat the liquid in the chamber 19 surrounding the inner housing. The spaced walls of the inner and outer housings add materially to the retention of heat by the liquid in said chamber 19. The chamber of the inner housing may be readily filled with liquid as may be desired as is clearly shown in each embodiment. The kettle structure herein has performed very successfully.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A tea kettle structure, having in combination
an enclosed outer housing having a top, a bottom and an annular side wall,
an inner housing having a chamber therein and being disposed within said outer housing and having a top, a bottom and an annular side wall,
means securing said top wall of said inner housing with said top wall of said outer housing,
said inner and outer housings, save for the engagement of their top wall portions, being in closely spaced relation forming a chamber therebetween,
an upset portion engaging said bottom walls of said inner and outer housing transferring heat to said bottom wall of said inner housing,
said inner housing having imperforate side and bottom walls,
said top wall of said inner housing having spaced apertures therein
whereby water in said chamber between said housings is heated through the bottom and side walls of said outer housing and by the bottom and side walls of said inner housing by heat transferred thereto through said upset portion, and
a spout projecting from said outer housing communicating with said chamber between said housings.

2. The structure set forth in claim 1, wherein
a handle is carried by said outer housing, and
said means comprises a fastening member securing said handle and said top wall of said inner housing through said top wall of said outer housing.

3. The structure set forth in claim 1, wherein
a deverting plate underlies said spout providing an entry passage into the chamber between said housing.

* * * * *